July 28, 1942.    E. G. STRECKFUSS ET AL    2,291,260
MEAT SLICER
Filed July 27, 1938    3 Sheets-Sheet 3

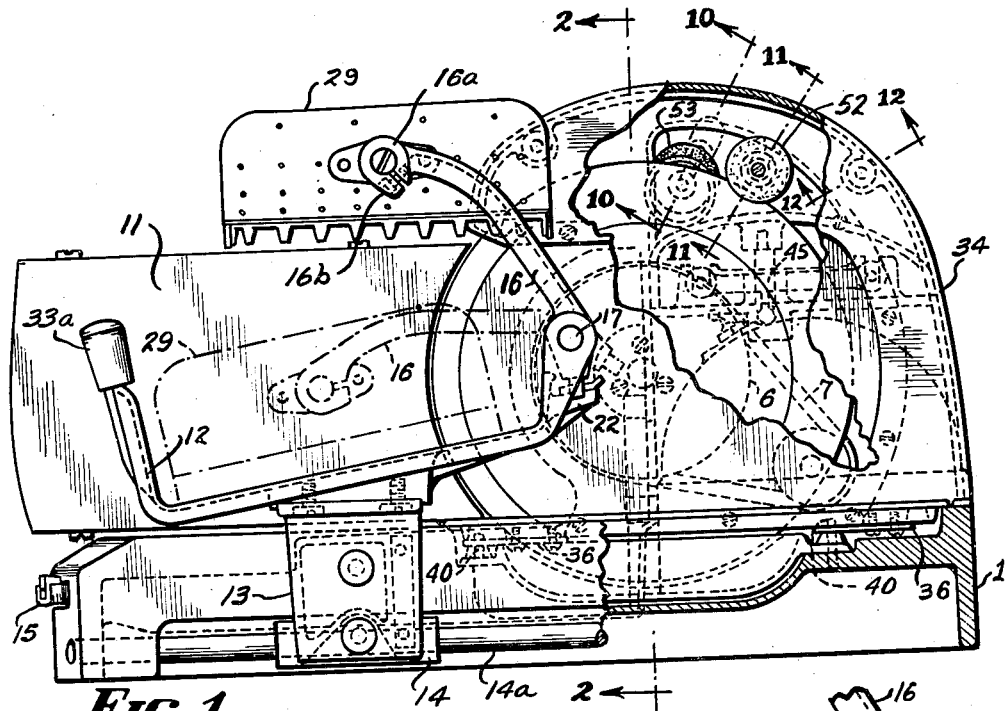
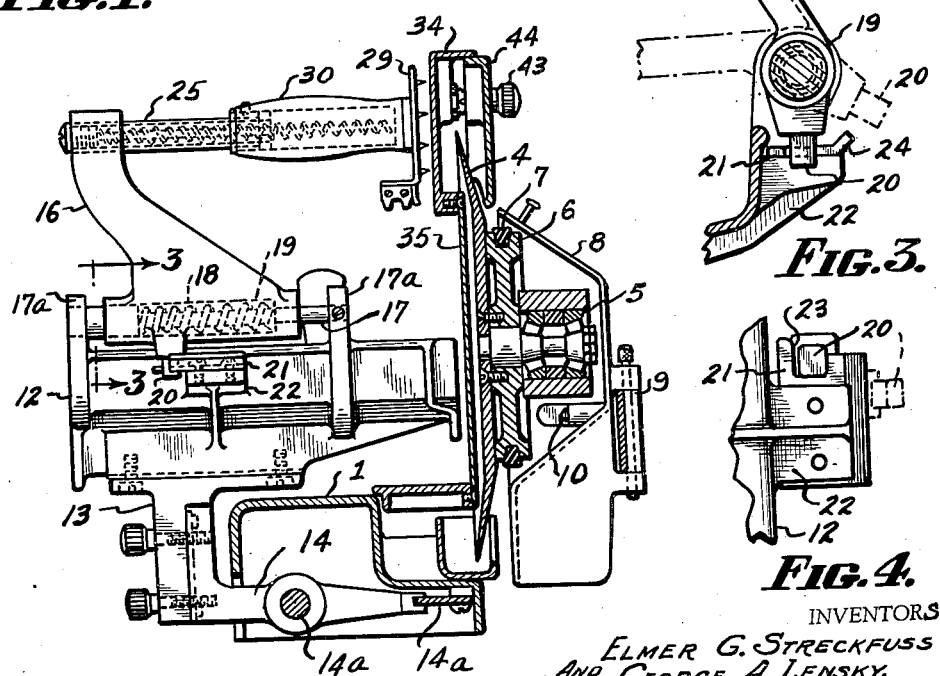

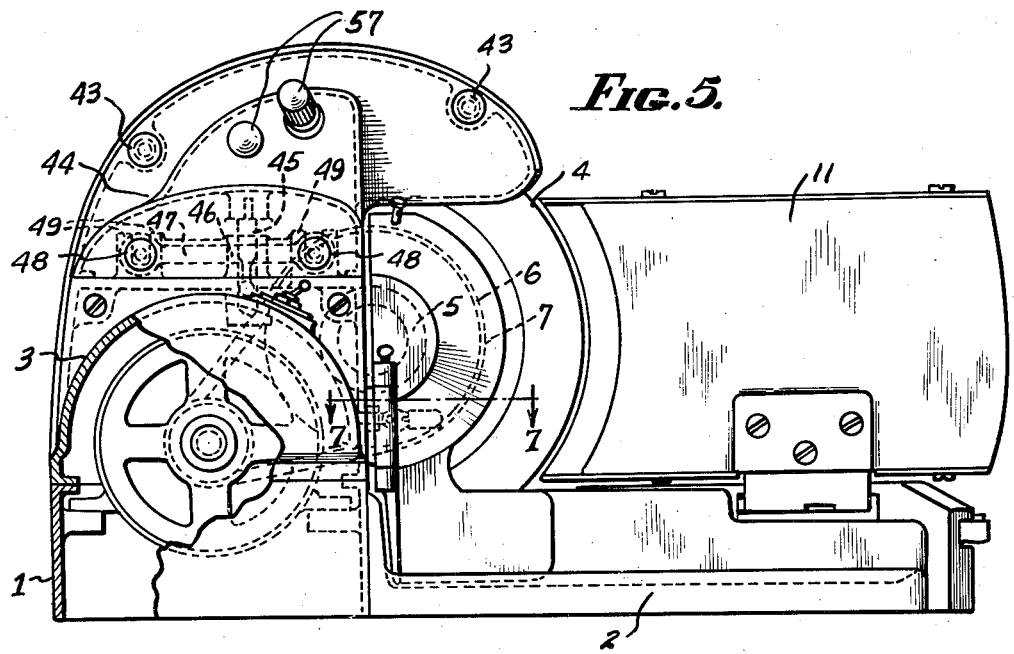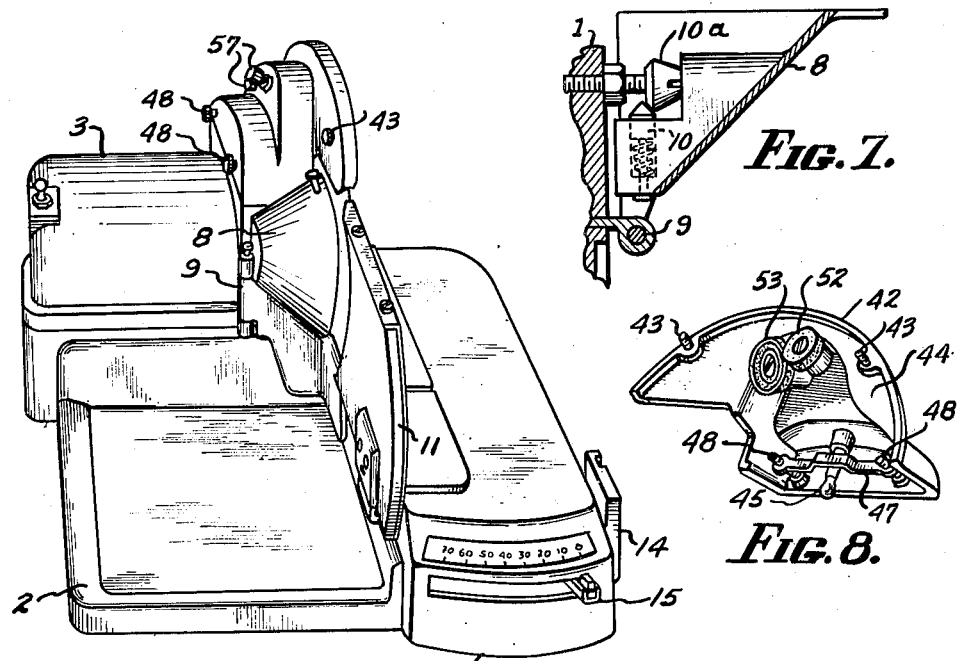

INVENTORS.
ELMER G. STRECKFUSS
And GEORGE A. LENSKY.
BY Allen & Allen
ATTORNEYS.

Patented July 28, 1942

2,291,260

UNITED STATES PATENT OFFICE 2,291,260

MEAT SLICER

Elmer G. Streckfuss and George A. Lensky, Cincinnati, Ohio, assignors to The Cincinnati Time Recorder Company, Cincinnati, Ohio, a corporation of Ohio Application July 27, 1938, Serial No. 221,572

6 Claims. (Cl. 146—102)

Our invention relates to meat slicers of the slice adjusting abutment plate type, and has as its objects the improvement of the same in a number of respects.

In particular our invention relates to the meat carriage and meat clamp arrangements. In meat slicers in which the knife guard projects over the knife from above and thus blocks the path of any high object which is moving across the knife, it is desirable to avoid the positioning of the meat pusher and clamp device in a position where it will strike the knife guard. However, such a meat pusher and clamp device should be movable to a position when cutting low pieces of meat so that it will project into a position which, if raised as to the higher level, would in fact strike the knife guard. Provision is made in our improvements for the desirable action above noted.

Also in a meat clamp and pusher where energized by a spring and mounted on the meat carriage, it has been the practice heretofore of mounting the pusher arm on a slide means on the meat carriage and the pusher energizing means applied to the pusher arm bearing portion overlying the slide means. Also the pusher energizing means was used to latch the pusher in inoperative position. To get sufficient travel of the pusher plate, the space between the pusher arm slide bearings was shortened to the point where considerable binding occurred at the slide means when the arm was pulled back against the spring means. To reduce this binding action anti-friction means, such as ball bearings or rollers, were incorporated in the arm bearings. Since the pressure against the pusher plate, when pushing a substance towards the knife, was at some distance removed from the slide means, an appreciable amount of binding force was present also, hence a pusher energizing means of greater force was required.

Thus it is desirable, first, to have the pusher energizing means at the pusher end of the arm where it would be at the operating handle and at or near the center of load on the pusher plate, thus eliminating the tendency to bind; secondly, widely spaced bearings at the pivoting end of the pusher arm with a second spring means of greater compressive resistance than the first for latching the arm in inoperative position. Our improved device provides for this functioning of the meat clamp.

We also provide for a simple manner of holding the meat clamp in idle position and provide for the handle on the pusher plate being mounted directly on the back of the plate itself which is simple and convenient.

Our resulting meat clamp structure is one in which the handle or grip therefor extends crosswise of the carriage and directly mounts the clamp or pusher, thus providing a very convenient arrangement for manually actuating the carriage.

In the general arrangement and structure for guarding the knife, we have built in a knife sharpener attachment which is built into the back knife guard casting and is operated by buttons entirely from the rear of the knife, the structure being very easy to get at without danger to the operator due to proximity of the sharp edge of the knife.

We accomplish our objects by that certain construction and arrangement of parts to be hereinafter more specifically pointed out by means of a specific example, the novelty inherent in which will be set forth in the appended claims.

In the drawings Figure 1 is a side elevation of the slicer from the carriage side.

Figure 2 is a section on the line 2—2 of Figure 1.

Figure 3 is a detail of the latch for the meat clamp and pusher arm on the line 3—3 of Figure 2.

Figure 4 is a detail taken from the bottom of the parts shown in Figure 3.

Figure 5 is a side elevation of the meat slicer from the motor side.

Figure 6 is a perspective of the slicer from the motor side.

Figure 7 is a detail of the deflector plate latching device.

Figure 8 is a perspective view of the grinder attachment unit.

Figure 10:
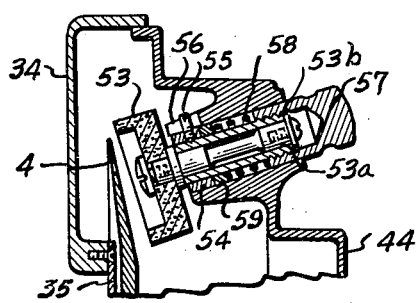
Figure 10 is a detail section on the push grinder mounting.
Figure 11:
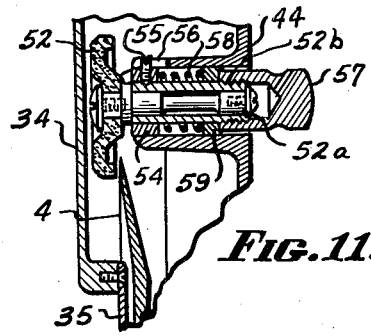
Figure 11 is a like section of the pull grinder mounting.
Figure 14:
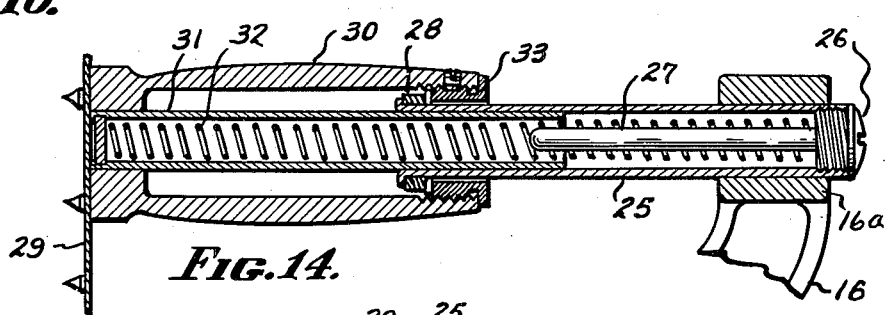
Figure 14 is a detail section of the meat pusher mounting.
Figure 9:
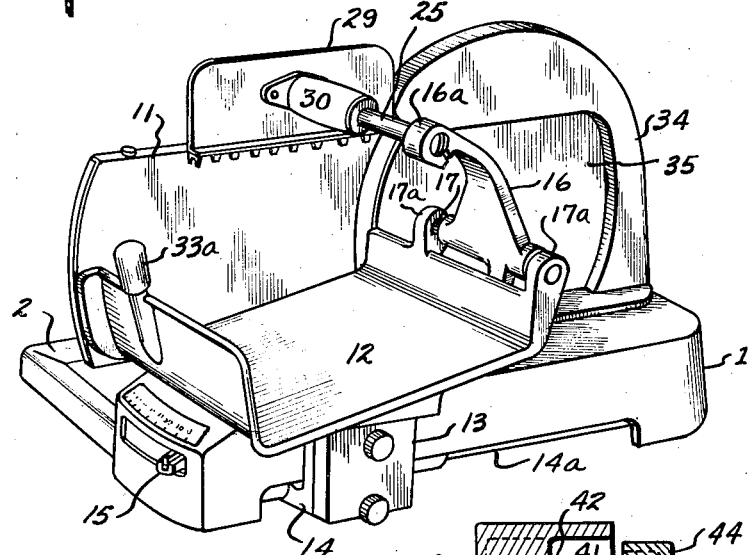
Figure 9 is a perspective of the machine with the meat carriage removed.

The machine has a main casting which includes the base 1 beneath the meat carriage, the meat receiving tray portion 2, the motor receiving housing 3. The cutting knife 4 has its shaft mounted in bearings 5 mounted in a portion of the main casting, and a pulley 6 whereby it is driven from a belt 7 from the motor. A dome shaped deflector plate 8 is hinged at 9 to the main casting, and has a spring pin latch 10 which engages a large headed screw 10a also set into the casting to hold this casing in closed position frictionally.

The slice adjusting plate, the adjustments for which have not been illustrated, is shown at 11 and the meat carriage is illustrated as having the meat carriage plate 12 and a depending bracket 13 and slide bracket 14 whereby it is mounted to slide on the guide rods 14a. The handle for adjusting the slice adjusting plate is shown at 15, the same being mounted in the carriage base member 1.

The meat clamp and pusher device is mounted on the meat carriage plate so as to move therewith. This device consists of the arm 16, which is mounted to slide over a rod 17 held between a pair of lugs 17a on the one side of the meat carriage plate. A spring 18 tends to hold the hollow cylindrical portion 19 of the arm which lies over the rod 17 in a position toward the knife. The portion 19 has a stud therein as at 20, which stud will swing to a position behind a slotted plate 21, thereby holding the arm against movement. The plate 21 (Figures 3 and 4) is mounted on the bracket portion 22 on the outside of the meat carriage plate wall and has a rectagular notch in it as indicated at 23.

When the arm 16 is pulled back against the spring 18, raised upwardly to the position indicated in the Figure 1, and then released, the spring 18 will push the portion 19 towards the knife until the stud 20 has engaged the notch 23, thereby holding the arm against movement. The notch and the stud are so located that when the arm is in latched position the pusher and clamp will not strike the knife or its guards in any position of the carriage. In Figure 1, the position of the arm when lowered and out of latched position is shown in dotted lines. In the lower and out of latched position of the arm 16, the spring slides the portion 19 until its end nearest the knife abuts against the inner lug 17a, and the stud 20 overlies the upwardly slanted lip 24 of the notched plate. The upward edge of the lip 24, the stud 20, and the lug 17a are so positioned that when the arm 16 is in the out-of-latch position the pusher and clamp plate will not strike the knife or its guards in any position of the carriage.

The outer end of the arm 16 is formed as a split boss 16a into which is clamped, by the clamp screw 16b, a tube 25 that serves internally as a guide for the pusher plate mounting. Into the outer end of this tube 25 is threaded a screw 26 which has a spring guide pin 27 projecting therefrom, the screw serving as a spring abutment. The inner end of the tube is curled outwardly and equipped with a fast collar 28 which may be knurled on its exposed face. Mounted on the pusher plate 29, which may be pronged to act as a clamp also, is a hollow handle portion 30 which is used to manipulate both the pusher plate and the entire carriage.

Into the socket at the inner end of the handle is pressed a slide tube 31 within which is housed the spring 32 which extends through this tube and thence through the tube 25, being guided by the pin or rod portion 27 within the latter tube. The handle portion 30 has a threaded sleeve 33 screwed in its outer end and locked by a set screw, which sleeve does not bear as a guide on the outside of the tube, but serves as an abutment with the collar 28 on the tube 25. The inner face of this sleeve can be knurled to ratchet against the knurled face of the collar 28.

The tube 31 bears within the tube 25, and the handle slides on this telescopic arrangement as a bearing. Thus, lubricant for the sliding action is located inside of the part and does not drip out or contaminate the hands of the operator in manipulating the handle.

This arrangement of handle is very desirable, even if the spring be omitted. The handle, carrying the pusher plate directly, slides on the hinged arm and is used by the operator very readily to hold the pusher against the meat, and at the same time move the carriage to and fro to slice the meat. There is no hinging action of the pusher plate and no binding of parts or difficulty in simultaneously pushing the meat and pushing the tray.

A knob 33a mounted on the forward wall of the meat tray is provided for operating the carriage when the clamp is latched in inoperative position.

To use the clamp and pusher plate for regular operations, the handle is pulled back against the spring until the inner end of the tube abuts against the face of the handle, and further movement of the handle in the same direction pulls the arm back from latched position. The clamp and pusher plate may then be swung down to position so that the plate engages the meat at a desired point. With the prongs of the pusher plate pushed into the meat and the handle released, the spring will push the plate toward the slice adjuster and the knife thus pushing the meat, or else the spring 32 may be omitted and the operator push the handle over manually. When the pusher plate is released behind the meat, the spring will push the arm forward as soon as the handle is released, so that for the distance of the movement of the cylindrical portion of the arm, the spring is called upon for no duty. Thereafter the clamp plate is moved by the spring or manually as described above.

When the carriage has been traversed to and fro until the last cut has been made, the handle of the plate is grasped, the plate pulled back readily against the force of the spring until the shoulder abuts against the tube face. The same handle is then used to pull the arm against the force of the spring 18 until the stud 20 on the cylindrical portion 19 is against outer lug 17a, whereupon the arm can be swung in behind the notched plate that serves to latch it back. In this position the handle can be released, and the meat plate will move forward to a position shown in Figure 2 which will permit it to clear the guards about the knife.

Figure 12:
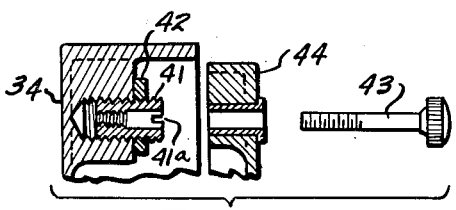
Figure 12 is a detail of the upper adjustable mounting in the knife guard member.
Figure 13:
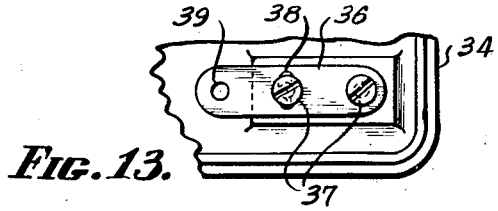
Figure 13 is a view from the under side of the knife guard adjustable mounting.

Referring next to the knife guard and sharpening features of our invention, we provide as the principal knife guard a semi-annular shaped member of channel form, indicated at 34 having a ledge at the lower end. The opening in the ring is at the space where the knife is exposed for cutting, as indicated in Figure 1 for example. Onto this ring shaped channel guard is screwed the face guard plate 35. The mounting of the member 34 is made adjustable as indicated in Figure 12 and Figure 13. At the forward and rearward lower edges of the ledge portion of member 34 there is mounted a plate 36 by means of two screws 37, one of which operates in a slot 38 of the plate, thus making it adjustable on the other screw as a pivot. The outer end of each of the plates has a hole 39 therein which, when the guard is mounted is placed on the studs 40 set in the main casting. Two externally threaded thimbles 41 slotted at the end for the insertion of a screw driver as indicated at 41a are adjustable in the member 34 and locked in position by the lock nut 42. The two thumb screws 43, which screw into the internally threaded portion of the thimbles, hold the member in position against the rear guard housing.

By adjusting the position of the thimbles the position of the upper part of the housing may be accurately determined with relation to the guard. This is important because the sharpener devices are mounted on this housing portion so as to make a unit construction.

Referring then to the sharpener devices (Figures 5, 8, 10, 11, and 12), we provide for attachment at the back of the knife of a casing or housing 44. This housing has a stud 45 thereon which drops into a boss 46 on the supporting casting at the back of the knife, and has a strap 47 which is used as a clamp, being equipped with two thumb screws 48 whereby it is adjusted from the outside of the housing. The supporting casting has an upstanding lug 49, which is straddled by the central part of the strap on the inside, while the housing is located outside of the lug. By tightening the thumb screws the strap is brought firmly against the lug, thus clamping the housing in place. The lug prevents the casing from turning about the pin and the socket arrangement therefor is such as to enforce a directly upward movement in mounting and dismounting the housing. This avoids marring the knife edge by striking it with the grinding wheels since these are raised free of the knife before the pin is out of its socket.

Thus there are two holes formed in the housing, the one for the front side grinding wheel 52 and the other for the back side grinding wheel 53. The wheels 52 and 53 have spindles 52a and 53a in sleeves 52b, 53b which have collars 54 thereon, the collars held slidably but not rotatably in the holes aforesaid. These collars, to this end, have pins in them as at 55 which lie in slots 56, in the inner ends of the bosses surrounding the holes. The wheels are rotatable on their spindles.

In both cases finger buttons 57 are provided which are slidably inserted in the holes from the outside and threaded onto the ends of the sleeves, springs 58 surround the sleeves and bear on the buttons, and stop collars 59 are pressed into the holes in the casting, against which the springs bear. In the instances of the front grinder wheel the stop collar is located near the inner end of the holes and restricts the outward movement of the sleeve and operating button. In the instance of the back grinding wheels the stop collar is near the outer end of the hole and restricts the inward movement of the sleeve (see Figures 10 and 11 respectively).

The result of this construction is that when the housing is in place, the two grinder wheels will be arranged one on each side of the knife in proper adjustment. When it is desired to grind the knife the front side grinding wheel is pulled in against the knife and the back side grinding wheel is pushed in against the knife. It may be observed that this construction provides for a less number of parts than would normally be required because, to a large extent, the parts are the same for each grinder, and the arrangement is all that is changed. Also the mounting of the grinders as a unit with the back knife guard housing member makes for simplicity, and the two grinders are both operated from the back of the knife thus avoiding the operator reaching across the top of the knife with possible consequent danger of cutting himself if his hand slips.

We have not attempted to illustrate alternative constructions in the parts hereinabove described, and they are intended as illustrating the inventive features of our device which will be set forth in the following claims.

Having thus described our invention, what we claim as new and desire to secure by Letters Patent is:

1. In a meat slicer having a traveling meat carriage, an arm mounted on a pivot at right angles to carriage movement, a projection on said arm in the same general direction as said pivot and a meat pusher plate, said plate being slidably mounted on said projection to move to and from the position of pushing meat across the carriage, and a handle mounted on the pusher plate and extending telescopically over the said projection for manipulating the plate and also the carriage, said projection being tubular, and the slidable mounting of the plate comprising a tube sliding within said tubular portion.

2. In a meat slicer having a traveling meat carriage, an arm mounted on a pivot at right angles to carriage movement, a projection on said arm in the same general direction as said pivot and a meat pusher plate, said plate being slidably mounted on said projection to move to and from the position of pushing meat across the carriage, and a handle mounted on the pusher plate and extending telescopically over the said projection for manipulating the plate and also the carriage, said projection being tubular, and the slidable mounting of the plate comprising a tube sliding within said tubular portion, and abutments on the handle portion and on the tubular projection to serve as an outward movement stop for the pusher plate.

3. In a meat slicer the combination with a meat carriage of a meat pusher comprising means as an arm mounted on the carriage, a pusher plate, means for slidably mounting same to move with respect to said arm means to and from a meat cutting point, spring means normally projecting the plate toward the meat cutting point, the means for mounting the arm means on the carriage comprising a slide, a spring urging the arm means toward meat cutting position on said slide and a latch arranged to engage said arm and retain it in elevated position retracted against the said spring action.

4. In a meat pusher, a pivotal support therefor, movable with a meat carriage, spring means urging the support toward a cutting point, a pusher plate slidably supported on the support, and spring means between the plate and the support urging the pusher plate toward said cutting point, said support including a latch for holding the arm against its spring means, when retracted against the spring means and elevated, but without affecting the spring means for the pusher plate.

5. In a meat slicer the combination with a meat carriage of a meat pusher comprising means as an arm pivotally supported on the carriage, a pusher plate, means for slidably mounting the same to move with respect to said arm means to and from a meat cutting point, spring means normally projecting the plate toward the meat cutting point, and means for latching the arm means in raised position on the carriage, the slidable mounting and spring means comprising a handle on the back of the plate, a slide rod held in the arm means, said handle sliding on said rod, and a spring located within the handle and the rod.

6. In a meat slicer the combination with a meat carriage of a meat pusher comprising means as an arm pivotally supported on the carriage, a pusher plate, means for slidably mounting the same to move with respect to said arm means to and from a meat cutting point, spring means normally projecting the plate toward the meat cutting point, and means for latching the arm means in raised position on the carriage, said means including a spring tending to keep the arm in latched position, said means comprising a spring urging the arm on the carriage toward the meat cutting point, a lug on the arm, and a notched element arranged to engage the lug when the arm means is in raised position.

ELMER G. STRECKFUSS.
GEORGE A. LENSKY.